Sept. 17, 1963　　　G. KIPER ETAL　　　3,103,862
SELF-TIMER FOR CAMERAS
Filed Sept. 26, 1961　　　　　　　　　　　　2 Sheets-Sheet 1
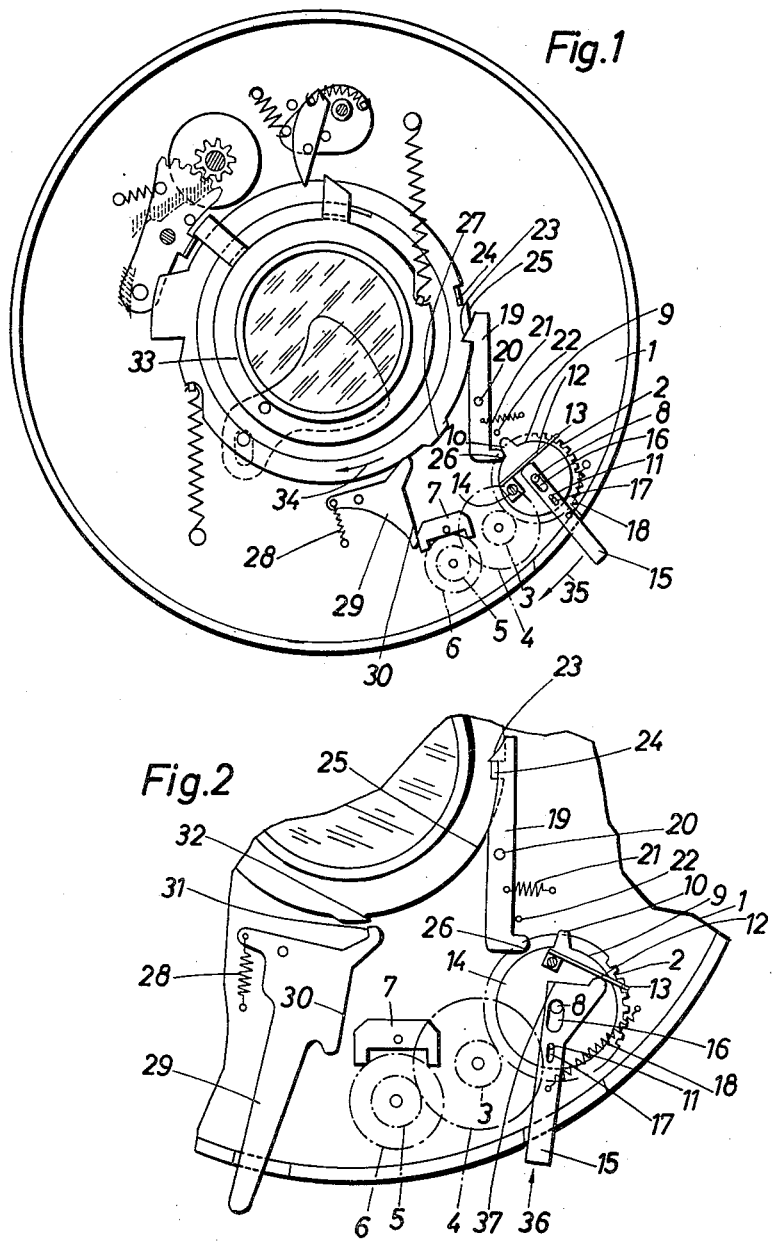
INVENTOR.
GERD KIPER
BY HANS-DIETRICH SAUERMANN Sept. 17, 1963  G. KIPER ETAL  3,103,862
SELF-TIMER FOR CAMERAS
Filed Sept. 26, 1961  2 Sheets-Sheet 2
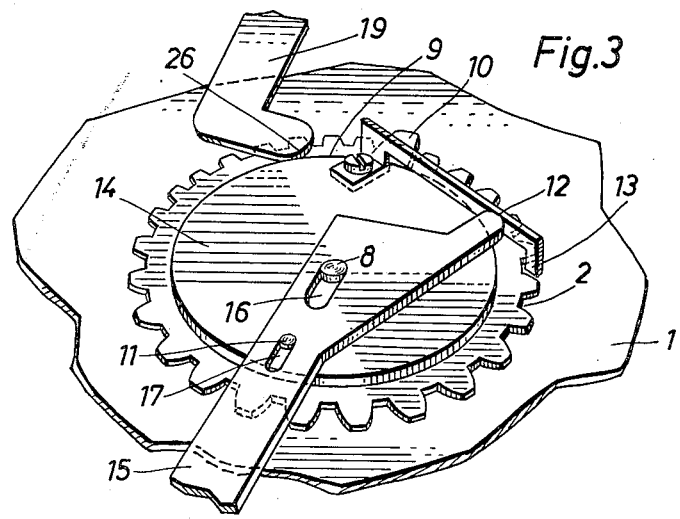
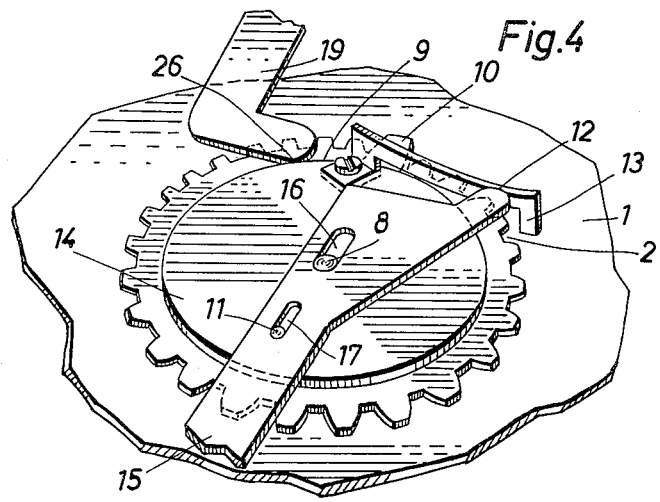
INVENTOR.
GERD KIPER
HANS-DIETRICH SAUERMANN
BY
Michael S. Striker
Attorney United States Patent Office 3,103,862
Patented Sept. 17, 1963

3,103,862
SELF-TIMER FOR CAMERAS
Gerd Kiper, Unterhaching, near Munich, and Hans D. Sauermann, Munich, Germany, assignors to Agfa Aktiengesellschaft, Leverkusen-Bayerwerk, Germany
Filed Sept. 26, 1961, Ser. No. 140,928
Claims priority, application Germany Oct. 5, 1960
3 Claims. (Cl. 95—53.3)

The present invention relates to cameras.

More particularly, the present invention relates to self-timers of cameras.

It is conventional to provide cameras with self-timers which enable the operation of the shutter to be delayed. These self-timers are ordinarily used only rarely. Most of the time the operator will make to photograph where the shutter is immediately actuated at the will of the operator so as to make the exposure. However, under certain circumstances, as where the operator wishes to be included in the photograph, it is desirable to be able to delay the actual operation of the shutter after the release mechanism is actuated for a predetermined number of seconds which may be on the order of 8 or 10 seconds, so as to give the operator of the camera the opportunity to place himself before the camera so as to be included in the exposure.

Conventional self-timers have several drawbacks. Thus, once a conventional self-timer is set to provide the predetermined delay in the operation of the shutter, it is not possible with most cameras to return the self-timer to its rest position without actuating the shutter. For example, if the operator should set the self-timer for operation and then the operator should change his mind and not wish to use the self-timer, with most cameras it is impossible to return the self-timer to its rest position and it is necessary for the operator to make the next exposure with the delay which is introduced by the self-timer. Those cameras which do provide self-timers which can be returned to their rest positions without necessitating actuation of the shutter do so at the cost of serious disadvantages. For example, some cameras of this type include elements of the self-timer mechanism which are necessarily operated every time the shutter is actuated, so that advantage cannot be taken of the fact that the self-timer mechanism is actually necessary only rarely and the parts of the self-timer mechanism must therefore be of the same quality and manufactured with the same precision as the parts of the camera which are always used at each exposure. Moreover, some of these known structures include such elements as slip clutches and the like which become rapidly worn away and which are particularly sensitive to atmospheric conditions such as dampness and the like. Also, with some known constructions the self-timer mechanism is so related to the structure for preventing a double exposure that even though the self-timer mechanism may be returned to its rest position before actuation of the shutter, this can only be done while wasting a film frame.

It is accordingly a primary object of the present invention to provide a self-timer mechanism which will avoid the above drawbacks. Thus, the objects of the present invention include the provision of a self-timer mechanism which is capable of being placed at any time in its rest position even if it has already been set for operation and the shutter has not yet been released, without any of the above drawbacks of requiring the shutter to be actuated, of wasting a film frame, or of requiring elements which are operated each time the shutter is actuated in a purely unnecessary manner.

Another object of the present invention is to provide a self-timer of the above type which can be returned to its rest position at any time at the option of the operator by actuation of the same element which is used for setting the self-timer ready for operation.

A further object of the present invention is to provide a self-timer which can very readily be incorporated directly into the shutter housing and which can be used with different types of shutters such as automatic shutters of the type which are automatically released upon cocking thereof and manually releasable shutters which can be retained in their cocked positions until manually released.

Also, the objects of the present invention include the provision of a self-timer capable of accomplishing all of the above objects and at the same time composed of simple rugged elements which are very reliable in operation.

With the above objects in view the invention includes, in a camera, a shutter means and a self-timer means cooperating with the shutter means for delaying the operation thereof. A drive means is operatively connected to the self-timer means for driving the same, and this drive means is movable between a rest position where it is incapable of driving the self-timer means and a drive position where it is set to drive the self-timer means. In accordance with the present invention a manually operable means cooperates with the drive means for placing the latter at any time, at the option of the operator, in its rest position even if the drive means has already been placed in its drive position and the shutter means has not yet been released, so that in this way it becomes possible for the self-timer means to be returned to its rest position at any time irrespective of whether or not the shutter has been actuated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly schematic transverse elevation of a shutter mechanism including the structure of the invention;

FIG. 2 is a fragmentary view of a shutter assembly which is of a different type than that of FIG. 1 and which also includes the structure of the invention;

FIG. 3 is a perspective view of parts of the structure of FIG. 2, when the self-timer means are ready for action; and FIG. 4 is a perspective view of the structure of FIG. 3, when the self-timer means are put out of the position for action.

Referring to the drawings, the self-timer means includes the gear train 2–5 which is located within the shutter housing 1. This gear train drives the escapement wheel 6 which cooperates with the anchor 7 of the escapement mechanism 6, 7. This self-timer structure includes the rotary gear 2 which forms a rotary member of the self-timer means which is directly driven by the drive means so that the drive is transmitted throughout the gear train 2–5 to the escapement mechanism 6, 7. A stationary pin 8 is carried by the shutter housing 1 and extends coaxially through the rotary member or gear 2 of the self-timer means so as to support the gear 2 for rotary movement.

The drive means which cooperates with the self-timer means to drive the latter includes a disc 9 which is coaxial with the gear 2 and which is also supported for rotary movement by the pin 8. This disc member 9 is located next to the gear 2 and is provided with a projecting portion 10. Also, the disc member 9 of the drive means carries a pin 11 which therefore turns with the disc 9. The drive means includes in addition to the disc 9 a springy pawl 12 which is fixed, as by a screw 14, to the disc 9 so as to turn with the latter, and the springy pawl 12 has a free end 13 forming a pawl tooth extending at an angle to the remainder of the springy pawl 12 and cooperating with the teeth of the gear 2. The cooperation of the pawl 12, 13 with the gear 2 is such that when the disc 9 together with the pawl 12, 13 are turned in a clockwise direction, as viewed in the drawing, the tooth 13 will simply ride over the teeth of the gear 2, while when the disc 9 together with the pawl 12, 13 are turned in a counterclockwise direction, as viewed in the drawing, the tooth 13 will be incapable of riding over the teeth of the gear 2 and therefore this gear 2 will turn with the rotary member 9 of the drive means so that the self-timer means will be driven at this time, which is to say, during counterclockwise turning of the disc 9.

The structure of the invention further includes a manually operable means which cooperates with the drive means to move it between the rest position shown in FIG. 1, where the drive means is incapable of driving the self-timer means, and the drive position shown in FIG. 2 where the drive means is set to drive the self-timer means. This manually turnable means includes the elongated lever 15 which is formed with a pair of longitudinal slots 16 and 17 respectively receiving the pins 8 and 11. Thus, the lever 15 may be turned about the pin 8 so as to turn the disc 9 between the positions of FIGS. 1 and 2, and at the same time the member 15 is longitudinally shiftable by the operator in the direction of the arrow 36 shown in FIG. 2. The drive means further includes the spring 18 which is fixed at one end to a stationary part of the shutter housing and at its opposite end to the lever 15, although it is equally possible to connect this opposite end of the spring 18 to the disc 9.

A catch lever means 19 is provided, and this lever means 19 has a catch position where it cooperates with the shutter means to releasably hold it in its cocked position, and also the lever 19 has a release position where it releases the shutter for operation. Thus, the lever 19 is shown as supported intermediate its ends for rotary movement by a stationary pivot pin 20 which is carried by the shutter housing. A spring 21 is connected at one end to a stationary member of the housing and at its opposite end to the lever 19 so as to urge the latter to turn in a counterclockwise direction about the pin 20, as viewed in FIGS. 1 and 2, and at its upper end, as viewed in FIGS. 1 and 2, the lever 19 has a tooth 23. The spring 21 urges the lever 19 toward a stationary pin 22 carried by the shutter housing, and when the drive means is set to drive the self-timer means the spring 21 can turn the lever 19 until it engages the pin 22 which thus limits the extent to which the spring 21 can turn the lever 19. The shutter includes a shutter ring 25 having a projection 24, and the tooth 23 of the catch lever 19 cooperates with the projection 24 in the manner shown in FIG. 2 for preventing release of the shutter, the shutter being of the type which is actuated upon counterclockwise turning of the ring 25 from the position thereof indicated in FIG. 2.

The shutters shown in FIGS. 1 and 2 are respectively of two basically different types. They both include rings which actuate the blades of the shutter. However with the shutter of FIG. 1 both of the rings of the shutter turn together to the cocked position of the shutter and then during actuation of the shutter only one ring returns to the rest position while the return of the second ring to the rest position is delayed so as to provide the opening of the shutter for the preselected exposure time. With the shutter of FIG. 2, which is also of a well known construction, the shutter drive turns the ring 25 first in one direction in order to open the shutter and then back to its original position in order to close the shutter. Moreover, the shutter of FIG. 1 is the so-called automatic type of shutter where the operator cocks the shutter and then upon turning of the cocking lever to a predetermined position the shutter is automatically released and is automatically actuated, so that with this type of shutter the shutter is not retained in its cocked position until released by the operator, whereas the shutter of FIG. 2 is of the type which is cocked and is retained in its cocked position until the operator actuates a shutter release member. Thus, the ring 25 of FIG. 1, because this is an automatic type of shutter, actually forms part of the shutter release means in that when this ring 25 reaches a predetermined angular position the shutter will be automatically released.

It will be seen that with both types of shutters the catch lever means 19 includes at its end distant from its tooth 23 a projection 26 which is adapted to cooperate with the projecting portion 10 of the disc member 9.

With a shutter of the type shown in FIG. 1 where the ring 25 upon reaching a predetermined angular position will automatically release the shutter for operation, this ring 25 carries a cam 27 which forms a release means for automatically releasing, when the shutter is released, a releasable restraining means which restrains the self-timer means against operation. This releasable restraining means includes the lever 29 which is supported for rotary movement by a stationary pivot pin carried by the shutter housing, and a spring 28 is connected at one end to the lever 29 and at its opposite end to a stationary pin in the housing so as to urge the lever 29 to turn in a counterclockwise direction, as viewed in FIG. 1. It will be noted that in the position of the lever 29 shown in FIG. 1 an edge portion 30 of the lever 29 engages the anchor 7 of the escapement mechanism so as to prevent oscillation of the anchor 7, and thus the self-timer means 2–7 is restrained against operation. This lever 29 includes a projection in the path of turning of the cam 27. Thus, when the ring 25 of FIG. 1 is turned in the direction of the arrow 34 during cocking of the shutter of FIG. 1, the cam 27 will approach the lever 29, and when the ring 25 of FIG. 1 reaches the position where the shutter is automatically released for operation, this cam 27 will have engaged the lever 29 so as to turn in a clockwise direction, as viewed in FIG. 1, in opposition to the spring 28, so as to displace the edge 30 to the left, as viewed in FIG. 1, away from the anchor 7 of the escapement mechanism, so that in this way the releasable restraining means is released by the release means of the shutter of FIG. 1 in order to release the self-timer means 2–7 for operation by the drive means.

With the shutter of the type shown in FIG. 2, the lever 29 is extended so that a free end portion thereof is accessible at the exterior of the shutter housing, and in addition the lever 29 includes a tooth 31 which cooperates with a shoulder 32 of the ring 25 so as to releasably retain the shutter in its cocked position. It will be noted that with the embodiment of FIG. 2 the spring 28 will urge the lever 29 to the position where the tooth 31 of the lever 29 cooperates with the shoulder 32 so as to prevent release of the shutter until the operator turns the lever 29 in opposition to the spring 28 in a clockwise direction to the position indicated in FIG. 2 where the shutter is released, and of course with this manual turning of the lever 29 the edge 30 will move away from the anchor 7 so as to release the self-timer means for operation.

FIG. 1 shows the second ring 33 of the shutter of FIG. 1 which turns together with the ring 25 during cocking of the shutter of FIG. 1. Of course, during release of the shutter of FIG. 1 both of the rings 25 and 33 also turn in the same direction, but at this time they do not turn together, one of the rings turning in advance of the other so as to provide the opening and closing of the shutter. During actuation of the shutter the ring 25 turns in advance of the ring 33 so that the turning of the ring 25 with respect to the ring 33 will result in opening of the shutter while the following movement of the ring 33 will result in closing of the shutter. During cocking of the shutter both of the rings 25 and 33 turn as a unit in the direction of the arrow 34 so that the shutter remains closed during cocking thereof.

When the manually operable elongated member 15 of FIG. 1 or FIG. 2 is turned by the operator in the direction of the arrow 35 shown in FIG. 1, a spring 18 is of course tensioned. At the same time, the pin 11 cooperates with the slot 17 so as to cause the disc 9 of the drive means to turn with the lever 15. The tooth 13 of the spring pawl 12 rides over the teeth of the gear 2 which at this time remains stationary. The projecting portion 10 of the disc 9 moves away from the free end portion 26 of the catch lever 19 so that the spring 21 can now turn the lever 19 in a counterclockwise direction, as viewed in FIGS. 1 and 2, until the lever 19 engages the stop pin 22. In this position the tooth 23 of the lever 19 is in the path of turning of the projection 24 of the ring 25 so that when the shutter is cocked the projection 24 will ride past the tooth 23 which will then immediately snap behind the tooth 24 so as to retain the shutter in its cocked position. At the end of the turning of the lever 15 the free end 13 of the pawl 12 will be in driving engagement with one of the teeth of the gear 2 so that during turning of the disc 9 in a direction opposite to that indicated by the arrow 35 of FIG. 1 the drive means will drive the self-timer means. However, the releasable restraining means 29, 30 cooperates with the self-timer means to prevent operation of the latter by the drive means.

During cocking of the shutter of FIG. 1, the rings 25 and 33 will turn as a unit in the direction of the arrow 34, and the projection 24 of the ring 25 will ride past and move slightly beyond the tooth 23 of the lever 19. At the end of the cocking movement the shutter is released simply by riding of a tip of the cocking mechanism from another tip of the structure which is actuated thereby, and just at the end of the cocking movement the projection or cam 27 engages the lever 29 so as to release the releasable restraining means so that the drive means can now actuate the self-timer means. The ring 25 can turn through a slight distance in a direction opposite to that indicated by the arrow 34, and the projection 24 will engage the tooth 23 so that further turning of the ring 25 is prevented, and this slight turning of the ring 25 is not sufficient to provide any opening of the shutter whatsoever. The drive means will now drive the self-timer which will provide a predetermined delay, and it will be noted that the disc 9 of the drive means turns together with the gear 2, so that the projection 10 approaches the projection 26 of the lever 19. At the end of the delay period provided by the self-timer means the projection 10 engages the projection 26 and turns the lever 19 in opposition to the spring 21 in a direction which displaces the tooth 23 from the projection 24, so that the shutter is now automatically released after the predetermined delay and an exposure is made in accordance with the preselected exposure time, all of the parts then being in the rest position.

With the embodiment of FIG. 2, the parts are such that the ring 25 at the end of the running down of the shutter returns to its starting position, and therefore in the starting position the tooth 31 of the lever 29 is already in engagement with the shoulder 32 of the ring 25. Thus, with the embodiment of FIG. 2 as soon as the lever 15 is turned by the operator in a clockwise direction so as to move the drive means from its rest position to its drive position, as described above, the spring 21 will be able to turn the lever 19 in a counterclockwise direction so as to immediately place the tooth 23 behind the projection 24 so as to prevent in this way the shutter from being released until the expiration of the delay provided by the self-timer. Actually at this time, the projection 24 will be located slightly in advance of the tooth 23 due to the holding of the ring 25 by the tooth 31 of the lever 29, so that when the operator turns the lever 29 in a clockwise direction, as viewed in FIG. 2, for the purpose of releasing the shutter, the ring 25 will turn through a slight distance placing the projection 24 in engagement with the tooth 23, and hereagain the slight turning of the ring 25 will be insufficient to provide any opening of the shutter whatsoever. Of course, this turning of the lever 29 by the operator so as to release the shutter for operation also moves the edge 30 away from the anchor member 7 of the escapement mechanism, so that with the embodiment of FIG. 2 the releasable straining means is also released upon actuation of the release means of the shutter, so that the drive means is now free to drive the self-timer means. Thus, the drive means will actuate the self-timer means until the projection 10 of the member 9 engages the projection 26 of the lever 19 so that the latter lever is turned in a clockwise direction to displace the tooth 23 away from the projection 24 and thus the shutter will now be released after the delay which is provided by the self-timer. Of course, the spring 18 is strong enough so that when the drive means is in its rest position the spring 18 is nevertheless strong enough to maintain the spring 21 tensioned with the lever 19 in the position where its tooth 23 will not cooperate with the projection 24, and thus in the rest position of the drive means the self-timer means has absolutely no influence on the operation of the shutter.

As has been indicated above, it may happen that after the self-timer mechanism has been set by the operator for operation, the operator changes his mind and wishes to return the self-timer mechanism to its rest position without actuating the shutter. This result is very easily accomplished with the structure of the invention simply by longitudinal shifting of the lever 15 in the direction of the arrow 36, this longitudinal shifting being permitted by the elongated slots 16 and 17 which respectively receive the pins 18 and 11. When the lever 15 is moved longitudinally in the direction of the arrow 36 indicated in FIG. 2, the upper or inner end of the lever 15 will cooperate with the springy pawl 12 so as to place the tooth 13 thereof in a position permitting the ring or disc member 9 to be turned by the spring 18 with respect to the gear 2 back to the rest position indicated in FIG. 1 where the projection 10 cooperates with the lever 19 to displace its tooth 23 away from the path of turning of the projection 24, so that with the structure of the invention it is very simple by longitudinal movement of the same lever which is turned to set the self-timer up for operation to simply release the operative connection between the drive means and the self-timer means so that the drive means can return to its rest position without any actuation of the self-timer and all of the parts returned to their rest position without any actuation of the shutter. Of course, when the parts are in the rest position the spring 18 has the position indicated in FIG. 1 and the lever 15 is again displaced outwardly so as to return the pawl 12 to the position where it will operate in the manner described above.

The movement of the elongated lever 15 longitudinally in the direction of the arrow 36 causes the free end 37 of the lever 15 to engage the springy pawl 12 and to displace this pawl 12 into a position where the tooth 13 will be out of driving engagement with a tooth of the gear teeth 2 so that the drive means can be returned to its rest position without transmitting a drive to the self-timer means.

Thus, with the structure of the invention it is possible at any time and in any position of the shutter to set the self-timer for operation or to return it to its rest position. In particular, it is easily possible to check as to whether the self-timer is set for operation, after the camera has not been used for a long time, for example, simply by pressing the lever 15 in the direction of the arrow 36. If the self-timer is set for operation then the drive means will simply return to its rest position, while if the self-timer has not been set for operation then of course the parts will simply remain in their rest position.

Of course, many variations in the details of the structure are possible without departing from the invention. For example, instead of providing an arrangement where a projection 10 moves into and out of engagement with the projection 26, the elements 9 and 19 may have a pin-and-slot connection with each other where the slot has a suitable shape so as to provide the desired cooperation between these elements. Moreover, the releasable restraining means instead of cooperating with the anchor 7 may be in the form of a tooth of the lever 29 which cooperates with one of the gears of the self-timer so that in this way the releasable restraining means can releasably hold the self-timer against operation.

It should be noted that the advancing of the lever 15 longitudinally in the direction of the arrow 36 is opposed by the springy pawl 12, and if desired an additional force may be provided opposing and limiting the movement of the lever 15 in the direction of the arrow 36. Thus, the drive spring 18 may have a special construction which will accomplish this result.

Furthermore, although the invention has been shown as applied to an automatic shutter and to a manually releasable shutter, it is also applicable to other types of shutters such as high-speed shutters.

It will be understood that each of the elements described above, or two or more together, may also find a useful application in other types of cameras differing from the types described above.

While the invention has been illustrated and described as embodied in self-timers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the means and range of equivalence of the following claims.

What is claimed as new and desired to be secured by Letters Patent is:

1. In a camera, in combination, shutter means; self-timer means cooperating with said shutter means for delaying the operation thereof, said self-timer means including a rotary motion-transmitting member and a pin supporting said member for rotary movement; drive means cooperating with said self-timer means for driving the same and including a rotary disc coaxial with said motion-transmitting member and also supported by said pin for rotary movement, said disc carrying a second pin and said drive means being turnable with said disc thereof about said first-mentioned pin between a rest position where said drive means is incapable of driving said self-timer means and a drive position where said drive means is operatively connected to said self-timer means for driving the same; and an elongated manually operable member formed with a pair of longitudinal slots through which said pins respectively extend, said manually operable member being turnable about said first-mentioned pin for turning said disc and said drive means between said positions thereof and said manually operable member being longitudinally shiftable with respect to said pins for placing said drive means out of driving engagement with said motion-transmitting member of said self-timer means at the option of the operator when said drive means is in said drive position thereof, so that at any time the operator may return said drive means to said rest position thereof.

2. In a camera, in combination, shutter means; self-timer means cooperating with said shutter means for delaying the operation thereof, said self-timer means including a rotary gear and a first pin supporting said gear for rotation; a disc also supported by said pin for rotation and carrying a second pin; a springy pawl member carried by said disc and having a free end cooperating with said teeth of said gear for turning said gear with said disc when the latter turns in one direction about said first pin; and an elongated manually operable member formed with a pair of longitudinal slots through which said first and second pins respectively extend, whereby said manually operable member may be turned about said first pin to turn said disc in a direction opposite to said one direction with respect to said gear so as to displace said pawl with respect to said teeth of said gear, and said elongated manually operable member being longitudinally shiftable for engaging said pawl and placing the latter out of operative engagement with the teeth of said gear, whereby a drive means which drives said self-timer means and which includes said disc and pawl may at any time at the option of the operator be placed out of driving engagement with said self-timer means.

3. In a camera, in combination, shutter means; self-timer means cooperating with said shutter means for delaying the operation thereof and said self-timer means including a rotary gear and a pin supporting said gear for rotary movement; a disc member supported for rotary movement by said pin; a springy pawl carried by said disc member and having a free end cooperating with the teeth of said gear for turning the latter with said disc member only when the latter turns in one direction, said end of said pawl riding over the teeth of said gear when said disc member turns in an opposite direction; a second pin carried by said disc member; an elongated manually operable member formed with a pair of slots through which said pins respectively extend, said slots extending longitudinally of said elongated manually operable member and the latter member having a free end located closely adjacent to said pawl, whereby said manually operable member by cooperation with said second pin may be turned in said opposite direction to turn said disc member with said manually operable member while said pawl is displaced with respect to the teeth of said gear; and a spring operatively connected to one of said members for urging both of said members in said one direction so that when said members are turned in said opposite direction and released to said spring said gear and the remainder of said self-timer means will be capable of being driven, said manually operable member being longitudinally shiftable for placing said pawl out of driving engagement with the teeth of said gear at the option of the operator so that said disc member may at any time be turned by said spring without driving said gear so as to place the disc member in a position where said spring has a tension insufficient to drive said self-timer means.

References Cited in the file of this patent

UNITED STATES PATENTS

| | | |
|---|---|---|
| 1,159,169 | Brown | Nov. 2, 1915 |
| 1,186,837 | Roth | June 13, 1916 |
| 1,212,383 | Nagy | Jan. 16, 1917 |
| 1,543,741 | Anderson | June 30, 1925 |
| 2,094,799 | Lingg | Oct. 5, 1937 |
| 2,245,248 | Aulenbacher | June 10, 1941 |
| 2,503,736 | Hodges | Apr. 11, 1950 |
| 2,727,445 | Rentschler | Dec. 20, 1955 |
| 2,831,411 | Gebele | Apr. 22, 1958 |
| 2,935,005 | Barth | May 3, 1960 |
| 2,938,445 | Strutynski | May 31, 1960 |
| 2,973,701 | Rentschler | Mar. 7, 1961 |
| 2,984,168 | Rentschler | May 16, 1961 |